April 20, 1971 R. H. SONNEBORN ETAL 3,575,765
PROCESS OF FORMING A SYNTHETIC RESIN PANEL
Original Filed April 4, 1963 4 Sheets-Sheet 4

INVENTORS
RALPH H. SONNEBORN,
FERNANDO ALVAREZ DE TOLEDO
BY & RONALD Z. BELL

ATTORNEYS

United States Patent Office 3,575,765
Patented Apr. 20, 1971

3,575,765
PROCESS OF FORMING A SYNTHETIC RESIN PANEL
Ralph H. Sonneborn, Fernando Alvarez de Toledo, and Ronald Z. Bell, Huntingdon, Pa., assignors to Owens-Corning Fiberglas Corporation
Original application Apr. 4, 1963, Ser. No. 270,727, now Patent No. 3,291,672, dated Dec. 13, 1966. Divided and this application Aug. 9, 1966, Ser. No. 585,215
Int. Cl. C09j 3/00
U.S. Cl. 156—332                     3 Claims

ABSTRACT OF THE DISCLOSURE

Method for producing a thin synthetic resin panel by forming a layer of polymerizable, thermosetting, liquid, synthetic resin syrup and a fibrous reinforcement mat into a lay-up, then heating the lay-up to a temperature sufficient to initiate polymerization of the resin, withdrawing exothermic heat of polymerization to control rate and degree of polymerization, and simultaneously molding the lay-up to selected cross section.

---

This application is a division of copending application Ser. No. 270,727 filed Apr. 4, 1963 now Pat. 3,291,672 dated Dec. 13, 1966.

This invention relates to synthetic resin panels and method and apparatus for production. More particularly this invention relates to reinforced synthetic resin panels characterized by improved durability, weather-resistance and esthetic appeal; to a continuous process for producing such improved synthetic resin panels; and to apparatus for producing such improved synthetic resin panels on a continuous basis.

Synthetic resin panels have found rather extensive application for transparent closures such as windows and skylights; for interior decorative partitions and walls; and as exterior screen fences, and the like.

It is well known, as evidenced by the volume of production of these panels, that at least in their original condition they impart an esthetic appeal to building partitions and other applications. Having a color or dye incorporated into the resin component, they are characterized by built-in color that is theoretically everlasting.

However, these prior products generally have been made with polyester resins, and exterior exposure has been devastating. Thus, under the effects of direct sunlight, rain and other weather conditions, etc., the prior panels have displayed extremely poor resistance to weathering. The weathering is characterized by rapid surface erosion of the resin causing fiber exposure and an extremely ugly appearance. Also, poor color stability has been evident from the decay in the vividness of color in a weathered panel as contrasted to a new unit. Thus, the prior products have exhibited extremely low resistance to ultra violet light. These characteristic faults of the prior products are very widely known.

Also, in prior art products, exposed fibers collect dirt and industrial fumes; ruin the appearance of the panel; and invite further weathering causing a larger drop in light transmission.

The foregoing changes, of course, take place over a period of from one to three years after installation. The result is a very unhappy customer when he realizes how much money and effort went into his original installation to provide such disappointing results.

The net result has been a bad reputation against the panel manufacturers. Further, the reputation of the glass fiber manufacturer has suffered because many people conclude that glass fiber reinforced plastic panels are "cheap" products.

It would, therefore, provide a substantial advance into the art if glass fiber reinforced synthetic resin panels could be produced that were of substantially improved durability against weathering; had good color stability and resistance to ultra violet light; had high gloss retention; and were characterized by high light transmission under all conditions of exposure including rain, sun, snow and others. It would also provide an advance to the art if such panels had good gloss retention by being resistant to surface erosion; were thus resistant to fiber prominence, and thus exhibited greater esthetic appeal.

PRIOR PRODUCTION

In the earlier days of reinforced polyester panels, hand lay-up batch operations were used. Curing was also by a batch operation, and this was effected for the most part in hot air ovens. In this operation, the wet resin lay-up was formed by laying down the various elements as follows:

(1) Bottom cover film of cellophane or acetate;
(2) Reinforcement mat of glass fibers;
(3) Addition of liquid resin to saturate the reinforcement mat; and
(4) Top cover film.

The lay-ups were then placed on caul sheets and cured to provide rigid panels.

Gradually various continuous processes evolved, using the polyester resins and glass reinforcement in about the steps set forth above. One such process utilizes heated molds with the lay-up moved therebetween for shape formation. Due to the relatively mild exotherm of polyester resins, satisfactory production was effected; however, the products displayed low durability and extremely poor weathering. Also, this and most of the other processes have been characterized by resin runs in the panels, fiber washing, mold binding, air inclusion in the resin and others.

Thus a number of problems have beset those who have attempted to produce panels on a continuous basis even with polyesters. To our knowledge, there has been no commercially satisfactory process for molding and/or curing panels having high durability, as from acrylic resins.

Accordingly, another substantial advance in the art would be provided by a novel continuous method for producing panels of acrylic resin.

THE DRAWINGS

FIG. 8 is an isometric view of the nip roll section of

FIG. 1 illustrating edge mastic application and liquid resin addition.

GENERAL INTRODUCTION

The present invention is of three-fold aspect as follows:

(1) Novel synthetic resin panels reinforced with glass fibers and characterized by a specific resin formulation and catalyst system, manipulated in specified manner for molding and curing; and the panels being characterized by greater weather resistance, color stability and esthetic appeal than analogous prior art products;

(2) The method of producing synthetic resin panels including:

(a) specific continuous formation; and
(b) continuous molding and curing; and (3) A production line capable of producing the improved panels of paragraph 1 on a continous basis, with modifications including complete integration from fiber formation through mat development and on through finished resin panels.

In view of the foregoing, several novel aspects will be evident as the description develops, including the following:

(a) Acrylic resin systems utilized in a continuous process. These resin systems are characterized by the development of a relatively high exotherm of polymerization which is capable of boiling the monomer components if not carefully controlled. Further, these resin systems have a substantial affinity for air which therefore must be excluded at least from certain critical phases of the operation.

Therefore, the present invention provides novel method and apparatus for handling these aspects of these resin systems. Although, within the broader scope of invention, the novel features developed here are understood to be applicable to other thermosetting resin systems.

(b) In the invention, unique mastic applicators are utilized to place a mastic bead along the edges of the wet lay-up. This serves a number of important functions including excluding air from the lay-up. Some resin systems dissolve air and do not release it during the exotherm of curing. Acrylics however appears to "absorb" air and then during the curing exotherm the air is driven out, causing blisters and snow defects which result in reject panels. This absorption appears to be a function of temperature, and from room temperature to about 100° F. is quite high. Reversal at exotherm is disastrous to production, and the air must therefore be excluded. This is unique with respect to acrylic resin systems, and accordingly handling this criticality in accordance with the invention provides novelty. This is effected through the sealing action of the mastic at the edge of the lay-up at the time of formation of the lay-up at the nip. The mastic then functions to prevent air entry during the remainder of the processing.

(c) A related problem regarding air inclusion in the laminate extends from the necessity of a uniform glass-resin ratio. Even though air be excluded from the laminate, if resin rich areas are developed along the edges between the mat and the mastic bead, a boiled panel may result. This is due to the fact that the exotherm of pure resin is more pronounced than the exotherm of the resin-fiber composite. During curing, the pure resin exotherm being higher is directed into the edges of the laminate and causes a slight boiling along the edges. Accordingly, because the mastic substantially eliminates resin rich areas at the edges, this exotherm of pure resin is prevented. Accordingly, the mastic provides a multifold aspect of:

(1) excluding air;
(2) reducing resin rich areas along the edge of the laminate;
(3) maintains edge thickness control; and
(4) provides more efficient resin utilization.

(d) Also, the manner of shaping the panel after initial cure or gel in the flat will become apparent.

In view of the foregoing synopsis a complete description of all features of the invention will now be set forth.

THE RESIN SYSTEM AND CONTINUOUS PRODUCTION OF PANELS THEREFROM

An advantageous resin and catalyst system that has been developed for use in the continuous process of invention utilizes a unique combination of peroxides, including:

(a) lauroyl peroxide
(b) methyl ethyl ketone peroxide
(c) tert-butyl peroxypivalate
(e) tert-butyl peracetate Thus, the complete resin and catalyst system includes the following ingredients in the proportions indicated:

| | Parts |
|---|---|
| Acrylic resin syrup (Du Pont Lucite #205) | 100 |
| Methyl methacrylate monomer | 10 |
| Lauroyl peroxide (percent) | 0.8 |
| Methyl ethyl ketone peroxide (percent) | 0.16 |
| Tert-butyl peroxypivalate (percent) | 0.72 |

In addition to the foregoing, it is also to be included within the scope of invention to use either straight tert-butyl peroxypivalate or accelerator modified tert-butyl peroxypivalate as the catalyst. Thus, the following system would be included:

| | Parts |
|---|---|
| Acrylic syrup (Du Pont Lucite #205) | 100 |
| Methyl methacrylate monomer | 12 |
| Tert-butyl peroxypivalate (percent) | 0.5–1.5 |

Still further, the following system is to be included within the scope of invention:

| | Parts |
|---|---|
| Acrylic syrup (Du Pont Lucite #205) | 100 |
| Methyl methacrylate monomer | 12 |
| Tert-butyl peroxypivalate (percent) | 0.5–1.5 |
| Accelerator 6 (Du Pont product: organic and inorganic chlorides in methanol and higher boiling alcohols) | $1.25 \times 10^{-4}$ |

The foregoing resins formulations are combined with glass fiber reinforcement mats in a novel and continuous manner in accordance with the present invention and, simultaneously, with and following the continuous formation, are cured and molded on a continuous basis to produce the novel panels alluded to above.

CONTINUOUS PANEL FORMATION AND CURE

Figures 1, 1A:
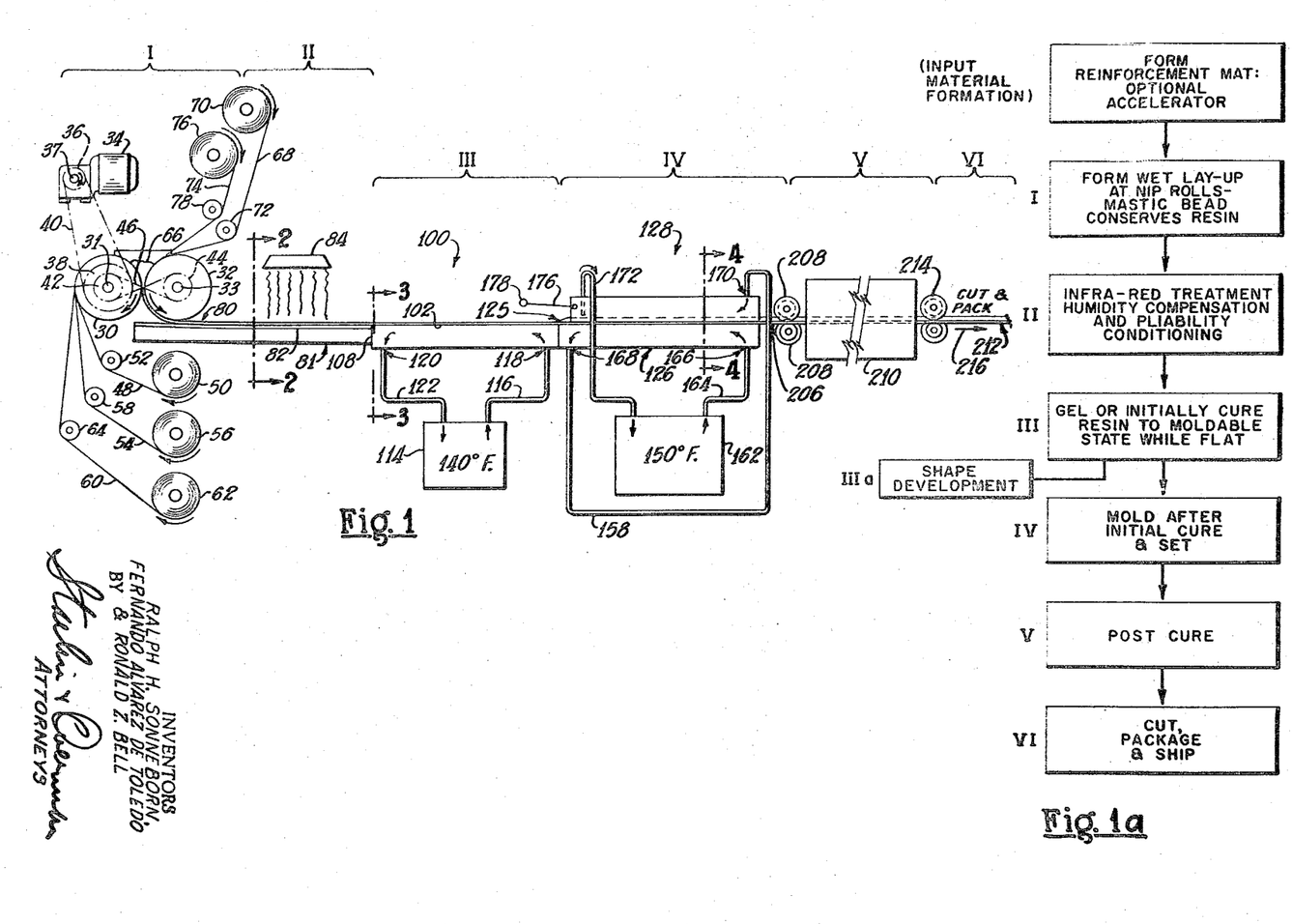
FIG. 1 is a general and partially schematic side elevational view of the important portion of apparatus of the present invention capable of forming and curing synthetic resin panels on a continuous basis.
FIG. 1a is a schematic representation of the process of invention.

By reference to FIG. 1 of the drawings, a side elevation will be observed of apparatus for the formation and curing of the novel synthetic panels of invention, both formation and cure being on a continuous basis.

THE VERTICAL NIP ROLLS

The actual formation of the wet laminate or lay-up takes place at the left or entrance end of the machine, at the vertical nip rolls. These are designated by reference numerals 30 and 32 and are understood to be cylindrical steel rollers supported on suitable anti-friction bearings at the ends. The bearings, of course, are mounted upon suitable support structures, not shown to avoid complicating the drawing.

It will be understood that the nip rolls 30 and 32 are optionally powered for simultaneous rotation in a common direction at the nip as indicated by the arrows. Driving power is derived from a gear reduction motor 34 having a sprocket 36 on its output shaft 37. Sprocket 36 is aligned with a larger drive sprocket 38 connected to the shaft 31 of roll 30. A chain 40 laps sprockets 36, 38 for driving roll 30 from the motor 34. Adjacent to sprocket 38 is a smaller sprocket 42. This is also carried on shaft 31 of roll 30 and is the same size as a corresponding sprocket 44 on shaft 33 of roll 32. Sprockets 42 and 44 are cross chained with a chain 46. Thus, when motor 34 turns in the arrow direction, the roll 30 is driven in the same direction, that is, toward the nip, and roll 32 is also driven toward the nip through the cross chain 46.

Another arrangement would be to gear the rolls together with a No. 5 pitch gear and drive one of them.

THE PANEL COMPONENTS

The basic component of the panels of this invention includes an acrylic resin system, optional reinforcement and/or filler materials can be included depending on whether structural or non-structural, decorative applications are contemplated.

A typical reinforced panel would include the following:

Top: surfacing mat;
Center: reinforcement mat(s); and
Bottom: surfacing mat.

These, of course, are impregnated and coated with resin that is cured into the finished product. During formation, these materials and the liquid resin are retained between top and bottom cover sheets such as cellophane or acetate, thus making a total of at least five layers in the lay-up during processing.

By reference to the left side of FIG. 1, note that the bottom cover film is designated 48 and is fed from a stock roll 50 over a guide roll 52 into tangential contact with nip roll 30. The bottom surfacing mat is designated 54 and is fed from the stock roll 56 beneath guide roll 58 and then into tangential contact with nip roll 30 to overlie the bottom cover film 48. Next, the reinforcement mat 60 is fed from a stock roll 62 and around guide roll 64 and into tangential contact with nip roll 30 on top of bottom surface mat 54.

From the foregoing, it will be noted that the reinforcement mat 60 moves in a tangential infeed into a resin bath 66 maintained between the nip rolls 30, 32. The reason for this particular method of feeding and the advantages and inventive novelty resulting therefrom will be brought out in detail later.

It should be pointed out that the cover films in as-received condition in the roll are not sufficiently smooth for processing through the system. Therefore, lateral tension is applied to the films, not to stress or stretch them, but instead to tension them to a flat condition.

It should also be pointed out that tension may be applied to the cover films to draw them through the nip. However, the mats are carried into the nip in unstressed condition upon or by the cover films. Thus, forward motion without frictional drag or distortion of any kind is provided to advance the mats through the nip.

The top components of the wet resin lay-up include the top cover film 68 fed from a stock roll 70 beneath guide roll 72 and into top tangential contact with nip roll 32. Top surfacing mat 74 is fed from the stock roll 76 beneath guide roll 78 and into top tangential contact with nip roll 32 overlying top cover film 68. Note that there is also tangential entry of these top feed components into the resin bath 66, similar to the bottom feed components.

As the various mats 54, 60, 74 pass through the nip, they are impregnated with the liquid resin and are entrained between the bottom cover film 48 and top cover film 68 to form a wet lay-up 80.

THE INSULATED RUN OUT TABLE HUMIDITY COMPENSATION SECTION

From FIG. 1, it will be noted that the wet lay-up 80 proceeds downwardly from the forming nip and to the right, and is supported by a table 81 having a flat top 82. This table 81 in the embodiment of the invention shown has the top made of fiber board material having a low heat transfer coefficient. Although it is within the scope of the invention to have the table top in the form of a heated plate structure, the present arrangement provides a more economical set-up by utilizing a radiant heat source on only one side with loss of heat retarded from the table side.

Thus, an infrared radiant heater 84 is positioned above table top 82 and is directed to radiate downwardly on the wet lay-up 80. As will be brought out more fully hereinafter, this pre-heat section is used for the purpose of providing moisture control compensation to the cover films 48, 68 in accordance with existing ambient atmospheric humidity conditions. Thus, heater 84 is effective to reduce moisture content of the cellophane top and bottom cover films 48, 68 to a low level, so that exact tensions can be provided for retaining the lay-up in a flat, controllable condition for the subsequent steps of the operation.

Regarding this section, it is to be understood that the infrared rays from heater 84 penetrate the top cover film 68 and other components of the lay-up including bottom cover film 48 to gently warm the entire mass.

Since the resin system contains catalyst, the effect of the heat is to help initiate the exothermic polymerization reaction the resin goes through during the polymerization reaction.

Figures 2, 3:
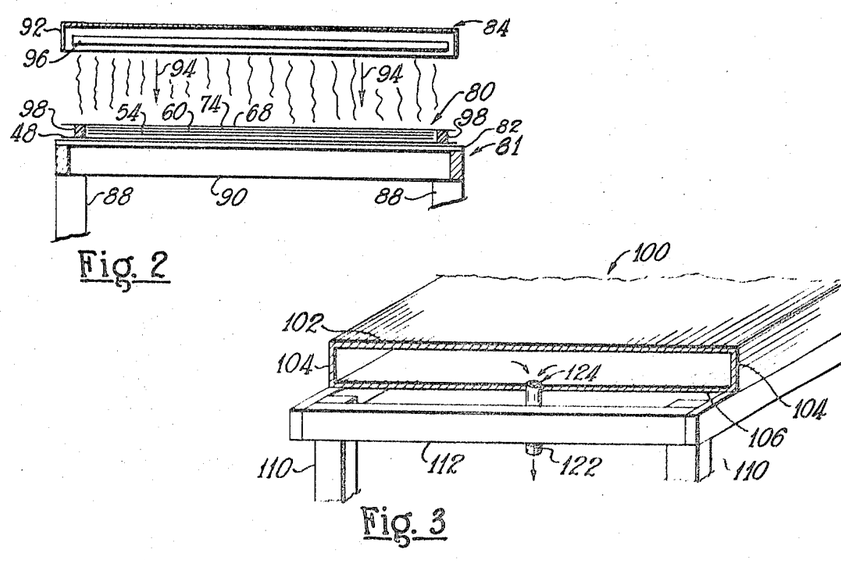
FIG. 2 is an enlarged section taken along line 2—2 of FIG. 1.
FIG. 3 is an enlarged isometric section taken along line 3—3 of FIG. 1.

The section view of FIG. 2 is provided to better illustrate the physical reaction which is imparted to the cover films in the humidity compensation section. Thus, the run out table 81 is provided with a fiber board top 82, supported on suitable legs 88, and cross stringers 90.

By further reference to FIG. 2, it will be noted that the infrared heater 84 includes a reflecting housing 92 having an open bottom for downward radiation along the arrow line 94. Within the housing 92 there is provided a radiating element 96, actuated by suitable power such as electricity to produce a controlled level of infra-red radiation.

By further reference to FIG. 2, it will be noted that the wet lay-up 80 includes the bottom cover film 48, bottom surfacing mat 54, central reinforcing mat 60, top surface mat 74 and top cover film 68. Along the edges there are ribbons of mastic 98 to retain the resin closely adjacent the edge limits of the reinforcement mat which are substantially the edge limits of the finished panel.

It will be noted that the rays from heater 84 precondition wet lay-up 80, aiding resin wet out of the reinforcement and surface mats, and in general, preparing the wet lay-up for the next stage of operation.

THE GEL PLATE—GEL SECTION

Looking back now to FIG. 1, note the gel plate which provides the first important physical (non-chemical) heating stage for initiation of the resin polymerization reaction. The gel plate is designated by the reference numeral 100. This is essentially a flat topped hot water tank of rectangular cross section as more clearly shown in FIG. 3. Thus, gel tank 100 includes the flat top 102 of sufficient body to resist sagging between its end supports; it may be suitably augmented by braces and baffles, not shown, to preserve flatness. The sides are designated 104, and the bottom 106. A water-proof structure is provided by welding the elements 102, 104 and 106. End closure is, of course, provided by end plates 108 designated in FIG. 1. The unit 100 is supported on legs 110 with cross stringers 112.

By reference to FIG. 1, it will be noted that tank top 102 is located at the same level as the top 82 of run out table 81. Thus, the wet laminate 80 slides along the production line on a level plane.

WATER FLOW IN GEL SECTION

By continued reference to FIG. 1, note that gel mold 100 receives warm water (100°–150° F. for example) at its down stream end from a heater 114. Water flows from the outlet of the heater through line 116 into the down stream end of the tank 100 by connection at point 118. The water then flows upstream through the tank 100, i.e. against the direction of movement of the wet lay-up 80 over the top 102. Water exhaust from tank 100 is at point 120. This outlet is better shown in the enlarged view of FIG. 3 and comprises a line 122 secured in an outlet opening 124 at the upstream end of the tank 100. From the outlet opening 124, the return water flows through the line 122 and back to the inlet of the heater 114.

From the foregoing, it will be observed that the wet lay-up 80 is always advancing against a slightly increasing temperature gradient; it first encounters the cooler end of the gel tank 100 and proceeds toward the warmer end. Thus, the polymerization reaction, which is exothermic in nature, is "kicked off" gradually or gently and is retained precisely in a controllable stage as it enters the forming mold section IV after having acquired a proper gel condition. This gel condition and the reason for forming a gel will be more clearly brought out during a discussion of the actual molding stage following, but it is pertinent to state here that the gel is carefully controlled and exotherm is not permitted to "run away." Thus, the gel platen 100 acts not only to initiate the resin polymerization reaction, but it also acts as a heat sink to absorb the heat of polymerization and thus precisely control the gel for the subsequent forming step. Note from the foregoing that the gel consistency is very precisely established and controlled to prevent or reduce running or flow during the contoured molding which follows.

Only a single gel platen is shown in the drawings and described above. However, operating conditions will dictate actual length of the gel section and temperature gradations to be maintained therein. Accordingly, the full scope of invention will include plural gel platens, controlled to different and appropriate temperature levels.

Although not shown, a surge tank may be optional for use in the gel tank water flow system.

The gelled lay-up is designated 125 in FIG. 1.

THE MOLD AND CURE SECTION

In FIG. 1, the bracketed section designated IV is the mold and cure section. This is characterized by matching top and bottom heated molds. In accordance with the present invention and the following description, it will be evident that a substantial degree of novelty is evident from this cooperative mold technique with control of the exotherm that takes place during the curing reaction which the resin undergoes.

THE BOTTOM OR FIXED MOLD

Figure 4:
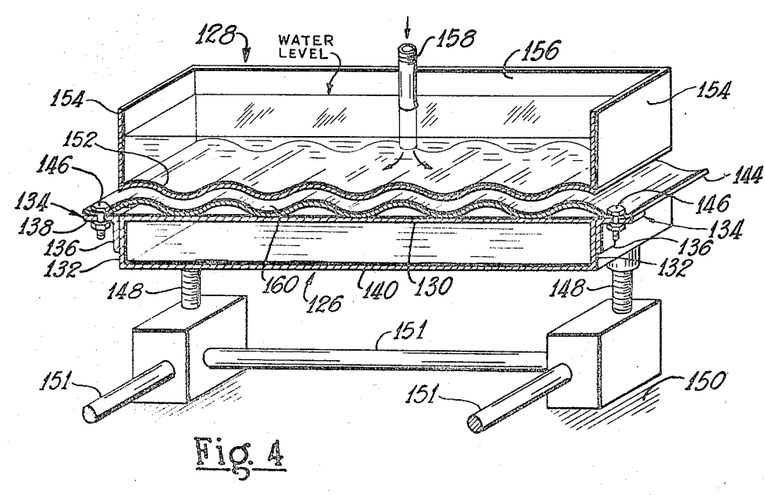
FIG. 4 is an enlarged isometric section taken along line 4—4 of FIG. 1.

First, it should be briefly noted that the bottom mold is designated by the reference numeral 126 and comprises essentially a flat topped water tank. The top mold is designated by the reference numeral 128, and is suitably built in the form of an open top water tank. Between these units is a cooperating pair of caul sheets or mold plates as shown in FIG. 4.

The bottom mold 126 comprises a flat top tank generally similar to gel mold 100 but with a caul sheet of particular configuration separably held to the top for support and heat exchange purposes. Thus, the bottom mold 126 includes a flat rigid top wall 130, either of suitable structural cross section to retain a flat configuration, or under-supported with suitable ribs as where thinner stock is used. The tank sides are designated 132, and it will be noted that these are inset from the edges 134 of brackets 136 providing a fastening or bolting flange 138. The bottom 140 extends between the bottom edges of sides 132. End plates are provided at 142, FIG. 6 to provide a water-tight structure.

Water inlet and outlet openings are provided at each end of the bottom mold tank 126 for circulation of water; circulation will be described later by reference to FIG. 1. However, it can be mentioned that the water inlet and outlet openings are suitably of the same type as those typified in FIG. 3, described above.

The bottom mold plate is held to the top wall 130 of bottom mold tank 126. This is designated 144, in FIG. 4, and it will be noted that it is of corrugated construction for the production of corrugated panels. This mold plate 144 is suitably wider than the panel produced and is suitably wider than the top 130 of water tank 126. Accordingly, the bottom mold plate 144 extends substantially to the edges 134 of brackets 136 and bolt 146 are passed through the fastening flange 138 to secure the bottom mold plate in position.

From the foregoing, it will be noted that the bottom mold plate 144 is held firmly; is supported against sagging; and is in perfect heat-exchange contact with the top 130 of bottom tank mold 126. It will of course be understood that the mold plate 144 is fabricated of material having a high coefficient of heat transfer, such as aluminum.

The interchangeable mold feature of the present invention requires that the bottom tank 126 be vertically adjustable. For this purpose, jack screws 148 are provided. Actually, the bottom tank 128 provides enough weight to resist longitudinal movement against frictional passage of the laminate. Therefore, the tank can merely rest on top of the jack screws 148 for a very effective yet simple and trouble-free arrangement. A floor 150 provides support and spacer bars 151 can be used if desired.

THE TOP OR FLOATING MOLD

As mentioned before, the top mold is designated generally by the reference numeral 128. This is suitably an open top water tank. Referring to FIG. 4, it will be noted that the bottom of the tank comprises a corrugaged mold sheet 152 of mating configuration to the bottom mold sheet 144. It should be noted that this sheet is about .040"–.060" aluminum and is therefore slightly flexible. Upstanding sides 154 and 156 secured as by welding complete the unit. Water inlet and outlet is suitably provided at each end by means of suitable lines, the one shown being designated by the reference numeral 158, and in this view, being the inlet.

A note at this point will highlight the advantages which accrue from the use of a flexible metal sheet in the bottom of the upper mold. Thus, the metal sheet, in being shaped, provides a true cross-sectional dimension for the panel being produced. By virtue of the fact that the metal sheet can be adjusted laterally, in mated relation with the under mold, exact cross sectional control of the panel being produced can be maintained. Thus, peaks and valleys of the finished panel can be made highly uniform in thickness.

In general, this is a self-seeking or self-compensating operation automatically inherent in the structure of the top mold; this is brought about by the manner in which the top mold floats on and cooperates with the bottom mold.

An operational feature of the flexible metal sheet upper mold resides in the fact it can ride over hard gel portions which may occasionally arise in the lay-up by reason of improper amounts of constituents or improper constituents. Upper passage of such hard gel portions, the flexible sheet rides over and then again reinserts itself or conforms perfectly into the proper molding relation with the lower mold. Thus, there is no disruption of the process.

Further, the cover films are not torn or ruptured by such gel particles because of the automatic compensation in the upper mold.

Note that the width of top mold tank 128 is less than the bottom mold sheet 144 to provide clearance for the bolts 146 holding the bottom caul sheet in position. It should be pointed out that the bolt arrangement for anchoring the bottom caul sheet in position is illustrative only.

Further note, in FIG. 4, that top tank 128 actually floats on the laminate which passes between the upper and lower molds in the space designated 160.

WATER FLOW IN MOLD SECTION

Referring again to FIG. 1, it will be noted that circulation through the mold system is as follows:

From a heater 162, water flows through an outlet connection via line 164 to an inlet connection 166 at the downstream end of the bottom tank 126. Water then flows upstream relative to panel movement and through an outlet 168. The line 158 is attached to outlet 168 and leads to the inlet end or downstream end of the top mold tank 128 for entrance as at the point 170. Water then flows from the downstream end of top tank 128 up stream of the direction of travel of the panel to be picked up by an outlet line 172 for return to the inlet of heater 162 for reheating. It will be observed that the open top tank 128 serves as a surge for the water circulation system.

MOLDING RECAP

It may be observed at this point that the gelled lay-up 125 is molded and substantially completely cured during its passage through the molds 126, 128.

It should also be pointed out that a novel feature of the mold stage is as follows. The mold tanks 126, 128 act in three ways:

(1) As heat input at the entrance to completely develop polymerization;

(2) As a heat sink back from the entrance end to control the resin against overheating after the exotherm is established; and (3) A molding pressure medium to positively impart intimate mold contact and a desired configuration to the finished product.

TOP TANK TETHERING—FIG. 5

As mentioned above, the top tank 128 floats on the top of the laminate 80 as it is pulled between the upper and lower mold sheets 152, 144; and thus provides molding and forming pressures. The manner in which the top tank 128 is restrained against movement by the laminate is shown best in FIG. 5.

Figures 5, 6:
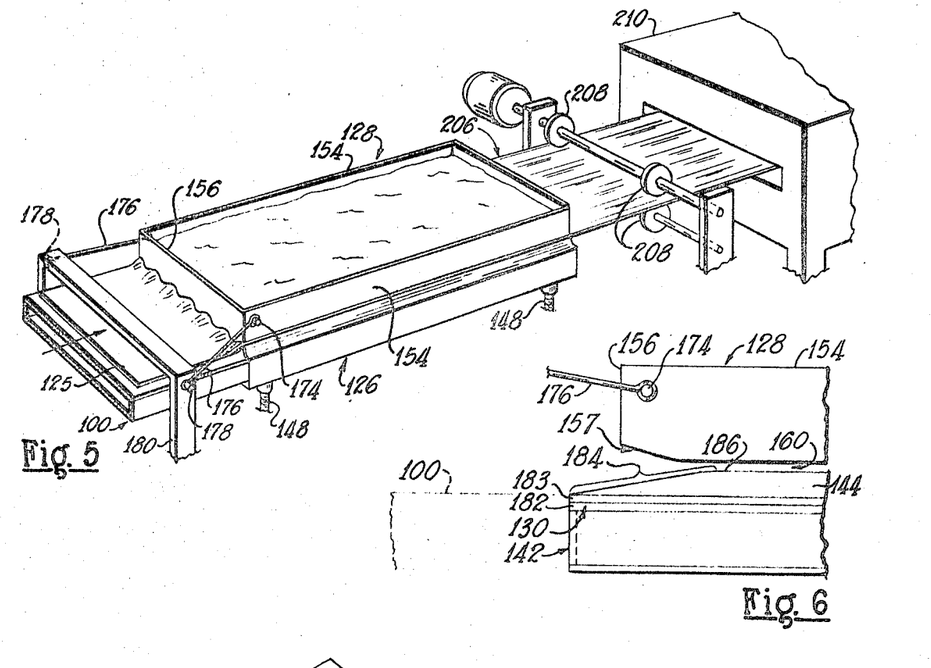
FIG. 5 is an isometric view illustrating the manner in which the top forming mold is held in fixed position on top of the moving laminate.
FIG. 6 is a fragmentary side elevation of the contoured entrance mouth of the molds.

At the forward end of each side 154 there is provided a fastening pin 174 as by welding. A tie cable 176 is fastened at one end to pin 174. An anchor pin 178 is connected to a machine frame element 180 spanning the production line. Each tie cable 176 is fastened at its forward end to its respective anchor pin 178. It will be understood that turnbuckle means or other adjustable device is provided somewhere in the tie cable 176 for axial adjustment of the top tank 128 for exact alignment over the bottom tank 126.

MOLD CONTOURED ENTRANCE MOUTH

In order to provide smooth flow of the gelled laminate from the gel plate 100 in between molds 126 and 128, contouring is provided as follows. The bottom mold plate is tapered at its entrance edge. This is best shown in FIG. 6. Note that the front end wall 156 of top tank 128 sets back from the front edge 182 of top plate 130 and front edge 183 of the bottom mold sheet 144 to allow the lay-up to "tuck in" before engaging the top mold. The bottom mold is contoured through the distance 184.

Each of the ridges 186 of bottom mold sheet 144 is flattened downwardly along the portion 184 in a gradual taper to the straight front edge 183. At the front 183, the ridges 186 and valleys all blend to a common line level.

Also the front edge of the bottom plate of the upper mold is contoured up in a similar manner, but through a shorter distance. This is shown at 157 in FIG. 6.

The foregoing is an embodiment providing shape development right at the mold mouth.

Thus, the incoming laminate is gently flowed to the mold contour in a gradually changing profile from flat to corrugated. It will be evident that other mold contours will be provided with similar mold mouths. Of course, when producing true flat sheets, it will be evident that only an upward taper at the front edge of the top mold will be advantageously utilized.

ADVANCE SHAPE DEVELOPMENT

Figure 6A:
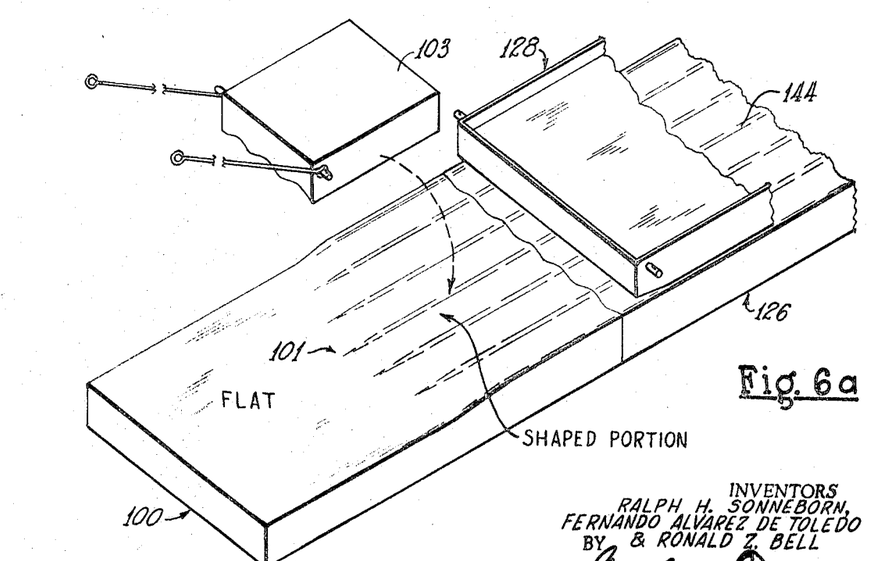
FIG. 6a is a fragmentary perspective view showing shape development.

While discussing this aspect of the invention, attention is directed to FIG. 6a. This figure illustrates the manner in which actual formation or shape development can be effected while the laminate is still on the gel plate 100. Thus the trailing end of the gel plate is contoured to match the bottom mold plate 144 of tank 126. This can be a straight transverse blend as shown in FIG. 6. Preferably, however, this will take a V configuration, as indicated by numeral 101 in FIG. 6a. This arrangement has the advantage of starting the shape development at the center of the lay-up and working out to each edge. This has a tendency to smooth the laminate and remove wrinkles from the cover films. This also aids in aligning the lay-up for good passage through the molds.

A tethered float 103 can be used at the center to aid in shape development and wrinkle smooth-out. This is positioned over the contoured area 101 and the bottom is contoured to mate with the area 101.

DRIVING MECHANISM

As the molded panel, designated by the reference numeral 206 moves out of the mold space 160, it passes between rotatable drive wheels 208, FIGS. 1 and 5. These wheels are covered with rubber to engage the upper and lower surfaces of the now rigid panel and grip the panel and pull it along providing propulsion from left to right of FIG. 1.

THE CURING OVEN

After leaving the drive wheels 208, the panel passes through the oven 210 where it is post cured to a substantially completely polymerized condition. The effect of the post cure is to reduce residual monomer to a low level, about 1% or lower. This oven can be a hot air oven; however, an infrared oven is preferred because of uniform heating and penetration to the center of the panel. This tends to make the polymerization proceed from the center out and is believed to enhance surface finish. Further, an infra-red oven is preferred because of the fact that the entrance and exit mouths can be left open without appreciable energy losses.

This oven preferably operates at a temperature of about 280° F. when using acrylic resin systems.

An additional effect of the oven is to relieve any molding stresses where the exotherm was relatively high.

The panel is thereafter designated 212, now being in a completely cured state just before a cut and pack operation. Auxiliary drive wheels 214 are provided at the exit end of oven 210. These provide the force necessary to push the fully cured panel strip 212 through slitter saws off to the right. The panels are very tough and, accordingly, a substantial amount of force is required to feed it to and through the slitter saws.

The cut and pack section is designated by the reference numeral 216, and is only generally indicated because of the conventional slitter saws and transverse shears used therein.

Having provided a fairly detailed but general description, it is now believed that certain important processing details should be brought forth in the light of the foregoing discussion.

COVER SHEET TENSION CONTROL

During prior discussion of the pre-heat or humidity compensation section, attention was directed to the infrared heater 84. This provided humidity compensation in the cover sheets 48 and 68 and warmed the entire wet lay-up in such manner as to let it flatten. As the lay-up moves forwardly towards the end of run out table 81, lateral tension is gradually applied to assure flatness and proper forward feeding.

THE IMPROVED WET LAY-UP FORMATION THROUGH THE VERTICAL NIP ROLLS WET OUT AND DEGASSING

Figure 7:
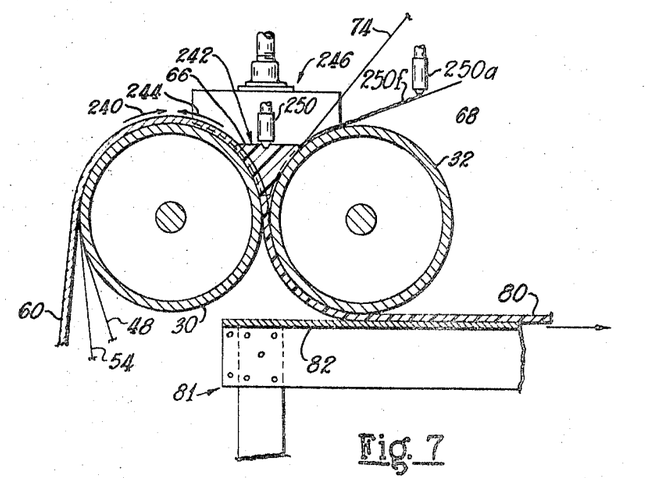
FIG. 7 is an enlarged sectional view of the nip roll forming section.

Referring to FIG. 7, note that the bottom cover film 48, bottom surface mat 54 and reinforcement mat 60 are lapped over the top half of nip roll 30; thus a tangential entry of the mats into the resin 66 is provided. This is indicated by reference arrow 240.

Production line speeds are on the order of several inches to a few feet per minute. Rolls 30, 32 are of a preferred size in the range from 6 to 8 inches in diameter; thus, a slow and gradual entry of the mat components into the resin bath 66 is provided. Noting the resin liquid level line 242, it will be evident that the slow movement along tangential arrow entry line 240 permits the resin to force out all gases from the mats 54, 60 along the line 244. Due to the relatively slow mat speed, the resin gently rolls around every fiber of the mats and thoroughly wets the fibers. This produces complete degassing of the mats; further the action is so gentle as to prevent fiber washing. At higher speeds added monomer in the resin system and more readily soluble mat binder will enable the same effects to be provided.

Top surface film 74 at the upper right of FIG. 14 is also gently wetted and degassed in the same manner.

A further advantage is evident from FIG. 7. By virtue of the fact that the reinforcement mat 60 and bottom surface mat 54 half lap nip roll 30, they are gently fed or carried into the nip in unstressed condition as contrasted to being pulled by the forward movement of the cover films of the wet lay-up and subsequently by the cured panels. This provides a very gentle entry and wetting action and prevents distortion and abuse to any of the components making up the panel system. Adjustment of resin viscosity of course contributes to proper wet out.

RESIN APPLICATION

Figure 8:
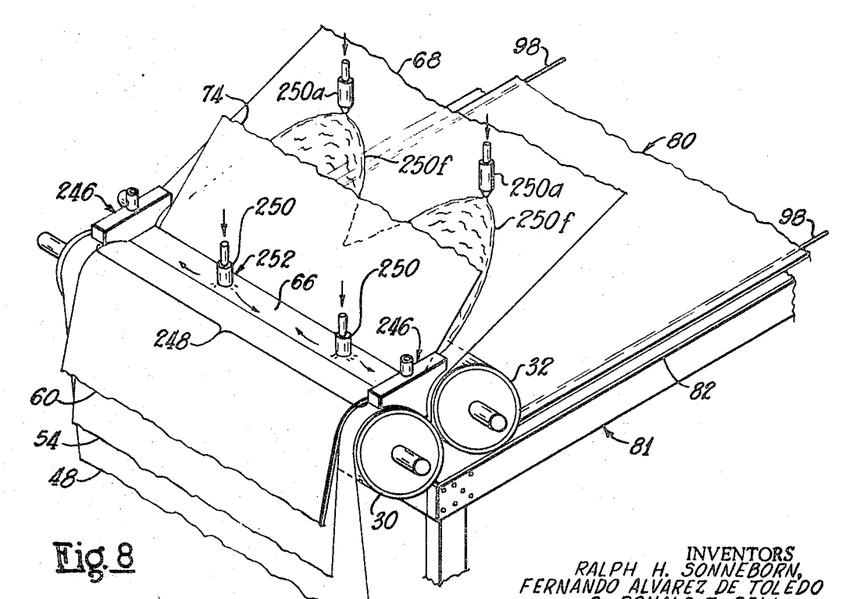

Referring now to FIG. 8, resin application to provide proper flow and wetting without distortion of the mat will be described.

It will be noted that nip rolls 30 and 32 are of a length slightly greater than the total width of the cover films 48 and 68. As best shown in FIG. 8, the mats 54, 60 and 74 are a few inches narrower at each edge than the cover films. Between the edge limits of the cover films and the edge limits of the reinforcement and surfacing mats, there are provided mastic applicators designated by the reference numerals 246. These are inverted generally triangular devices containing flow passages of specific configuration and capable of supplying a continuous bead of mastic inwardly of the edges of the cover films to prevent resin runout.

FIG. 2 shows the manner in which the mastic beads 98 are slightly beyond the edge limits of the reinforcement mats but inwardly of the edge limits of the cover films 48 and 68.

The resin pool 66 is formed between the limits established by the mastic applicators 246. These act as dams to retain the resin in the nip.

It has been found quite important that this resin pool 66 be maintained in a specific manner. The length of the resin pool is designated by the bracket reference numeral 248. Establishing the length of the resin pool 66 by the reference numeral 248, note that two resin fill nozzles 250 are provided at about one-fourth of the distance 248 inwardly from each of the mastic applicators 246. The points of resin application are designated by the reference numeral 252. The resin is deposited in the trough formed by the nip rolls 30 and 32 and moves in each direction laterally away from the points of deposition. By so operating, it has been found that only two entry points are necessary, thus providing flow for one-quarter of the width of mat formation and such flow being of such a gentle nature that washing of mat fibers and distortion of fiber lay in the mats is prevented. This provides most effective and economical resin application with minimum equipment.

A further important point relative to development of the resin pool is illustrated in FIG. 8. Thus the nozzles 250 have the delivery ends submerged in the resin to deposit the resin below the surface without turbulence as might be developed by a stream dropping through the air. This prevents air pick-up, as previously pointed out, the presence of air in acrylic systems presents a serious problem. Thus one more aspect of the invention is provided for control of that factor.

In view of the foregoing, it will be noted that a resin flow at the nips is balanced, and no appreciable flow streams are present.

An alternate procedure for introducing the resin syrup into the nip to form a bath 66 is also illustrated in FIGS. 8. This comprises positioning the feed nozzles 250 upwardly from the nip over the top cover film. This is designated position 250a (250 alternate position).

With the nozzles 250a positioned just above the surface of the top film 68, the resin is deposited on the films as a coherent stream, i.e., without picking up air. The stream spreads into a thin film 250f and flows by gravity down the cover film 68 and into the pool 66 without turbulence.

This method is advantageous in two aspects:

(1) No air is picked up because of lack of turbulence of flow; and (2) Any gas which might be present in the syrup is actually exposed and released while the resin is flowing in the film stage 250f.

It is to be understood that other methods of deposition than from the nozzles 250a can be utilized within the scope of invention. These however are relatively inexpensive, very practical, and can be adjusted and cleaned easily.

The extreme detail with which the resin application has been described hereinbefore may appear burdensome. However, it must be understood that the resin is a relatively high viscosity material and picks up air readily. Thus careful deposition prevents fiber washing and air occlusion.

Therefore, the present invention depends for its success upon the correlation of several factors, among them being:

(a) resin viscosity;
(b) resins of a certain formulation and accelerator content;
(c) resin application in a delicately controlled manner to prevent fiber washing and mat deformation;
(d) and the use of delicate surface mats to hold resin at the surface and provide resistance to surface erosion and consequently due to the delicateness of such surface mats to the use of a carefully correlated manner of liquid resin application of specified viscosity.

THE METHOD OF THE INVENTION

In FIG. 1a of the drawings, there is shown in schematic flow diagram form a recap of a principal part of the method for producing panels by this invention.

Actually, the process illustrated in FIG. 1a breaks itself down further into a two-fold aspect as follows:

(1) The method of producing the wet lay-up at the nip roll; and (2) The method of continuously curing the wet lay-up by first bringing it to a gel stage or partial cure, and then subsequently molding after such partial or initial cure.

By reference to FIG. 1a, it will be noted that the various steps encompassing the foregoing aspects include those set out below.

It is to be understood, of course, that the steps listed follow input material formation including reinforcement mat production directly from virgin fiber or otherwise, and the optional addition of accelerator to the mat as a prelude to resin addition:

Step I: Wet lay-up formation at the nip rolls;

Step II: Running the wet lay-up through a radiation zone for humidity compensation of the cover film and conditioning of the other components;

Step III: Pre-cure or gelling the wet resin lay-up by exposing it to a suitable temperature while sliding it across a flat gel plate prior to running it into the mold. The purpose of this step is to set or gel the resin and maintain uniform panel thickness at all areas during molding. Thus, proper gel control retards the resin against running from the high points of the mold to the low points; this prevents thin spots.

Step III-a: Initial shape development prior to molding;

Step IV: Molding and substantially curing the pre-gelled resin at suitable elevated temperature by pulling the gelled lay-up between upper and lower forming molds that act as a heat sink;

Step V: Then moving the molded panel through an oven to provide full cure; and

Step VI: Thereafter processing the panels by cutting and packaging for shipment.

In light of the foregoing brief perspective view of the method of invention, a more elaborate description of each stage and the co-ordination of the stages of the process will now be provided.

Thus, by reference to FIG. 1, now note the various steps in proceeding through the following description.

STEP I—WET RESIN LAY-UP FORMATION AT NIP ROLLS

By one apparatus or another, the reinforcement mats, surfacing mats and cover films are fed into a nip between two rolls in such manner as to provide tangential entry with good resin wet-out and degassing. An important aspect of the invention resides in the application of a mastic bead or ribbon along each edge of the lay-up to exclude air entry and prevent the liquid resin from running out of the cover films at the edges.

STEP II.—HUMIDITY COMPENSATION AND CONDITIONING

In as-received form, the cellophane cover sheets will have a variable humidity content. Therefore, in order to provide proper compensation and develop a controlled level of humidity for subsequent successful processing, the lay-up is radiated. This preshrinks the cover sheets to stable dimension. One way of doing this is to use a table and lamp according to FIG. 1. This action is also helpful to precondition the resin for its entry into the following gel stage. Fiber wet-out is also assisted.

STEP III—PRE-CURE OR GEL

As the wet lay-up enters the pre-cure or gel stage, it is gradually heated from room temperature, about 70°–90° F., on up to the gelling level of about 110° F. and up. Note that a heat sink assures proper control. Note further that initial cure is effected in the flat to provide uniform thickness throughout in later forming.

STEP III-A—SHAPE DEVELOPMENT PRIOR TO MOLDING

As pointed out in the prior discussion, shape development can begin to take place at the out end of the gel plate, thus prior to entering the molds. This is effected by gravity and optional floating "sled" weight. The purpose is to gradually shape the resin without imparting wrinkles to the cover films.

STEP IV—MOLDING OR POST-GEL FORMING

Next, the wet lay-up is gradually heated on up to a level not exceeding the boiling point of the monomer, about 214° F. Simultaneously, the mold pressures and forces are applied to shape and form the gel. The resin is now at full polymerization activity level, but still remains under precise control against exotherm "run-away." This is effected by providing a heat sink all around the lay-up.

Thus, Step IV reduces the resin to a hard stage and thus the thickness and shape of the panel are fixed.

STEP V—POST CURE

The cured panels from Step IV are next post cured and fully polymerized by a soaking period at about 250° F. for approximately 3–20 minutes. The panels are thereby fully completed and are directed to Step VI, following.

STEP VI—CUT, PACKAGE, ETC.

At Step VI, necessary cutting, shearing, stacking, packaging and shipment operations are effected to prepare the finished product for shipment to and use by the ultimate consumer.

EXTENDED SCOPE OF INVENTION PROCESS VARIABLES

The *temperatures* set forth in the foregoing description have been alluded to only in a general way. As a broad statement, stages II and III temperatures of film conditioning and resin gelling will be in the range from about room temperature to about 185° F. Time and resin system will determine the specific temperature used, as all factors are correlated.

In general, the stage IV temperature will fall within the same range. In this stage, the upper limit will be the boiling point of the monomer. This is about 214° F. Of course, this level must not be reached or the product will be ruined. Thus, room temperature to about 185° F. is suggested to provide a safety factor. Again, time and resin system are all correlated with temperature of processing.

In the post cure oven, stage V, temperatures in the range from about 200° F. to about 300° F. can be utilized, with a range of about 265°–285° F. being preferred.

The *residence times* in the various stages of the process are in the range from about 5 to 30 minutes for a 1/16" thick lay-up, comprising about 60%–70% resin and about 40%–30% fiber content. Generally, it will be stated that residence time is "sufficient" to attain the goal or condition sought in the particular section under consideration. Thus, proper gel requires quite exact residence; and this may well vary according to conditions and resin characteristics. Also, the temperature will be understood to be variable within limits to achieve the particular goal of a particular section. These naturally flow hand-in-hand.

In light of the foregoing, it will also be understood that a sufficient residence time in the molds will be established to provide the goal of that section.

Thus, the foregoing comments are meant to bring out the fact that the line speed is subject to some careful variation to provide proper residence within the full scope of invention. Also, temperatures and residence are carefully co-ordinated.

FIBER AND RESIN CONTENTS

As briefly mentioned above when discussing residence time, it was stated that the products of invention can have resin content in the range of 60%–70%. More broadly this range can be extended to 20%–80% of the weight of the panel. When so operating, it will be evident that the fiber content values will be the supplements. Thus, the preferred fiber range is about 40%–30%; and the broad fiber range is about 80%–20%.

COVER FILMS

Regenerated cellulose or cellophane has been disclosed as the cover film for use in the foregoing embodiments of the invention. It has been found that the best grade obtainable is desirable. This is admittedly a cost factor, but because of the fact that it is the difference between commercial success and failure, the cost is fully justified.

The extended scope of invention, however, would include the use of other cover films. Actually, stainless steel foil or the like could be conceivably used and stripped from the product at the exit end of the forming molds for recovery and recirculation through the system. In 1000 ft. lengths, this would be entirely feasible. Also, acrylic cover films, silicone containing films and the like, could be used, so long as they were strippable from the cured resin and provided operability in accordance with the method set forth herein. Polyesters and polyolefins may be used also.

Three acrylic resin systems have been specifically mentioned in the foregoing description. However, although specific systems have been set forth, it is evident that these are subject to modification. Thus, the accelerator can be either partially or entirely added to the mix and degas kettle, or partially or entirely to the various mats that go into the wet lay-up.

It is also believed that the present invention is applicable to other heat polymerizable resins adapted to the production of panels. However, this statement is made knowing full well that gel table temperatures, top and bottom mold temperatures and post-cure oven temperatures, as well as line speeds and other factors will have to be adjusted to accommodate such other resin systems.

It is, of course, submitted that there is sufficient versatility to the procedural method of the present invention to encompass the operating techniques that may be essential in processing other polymerizable resins than the various acrylics.

It is thus evident that the present invention is applicable to the use of other resins, at least those of flowable liquid formulation, in the production of panels on a continuous basis. The polyesters of the prior art, of course, come readily to mind. However, in view of the disadvantages inherent in these prior polyester products as discussed above, the likelihood of further production of those elements without some advance in technology as an aftermath of the impact of the acrylic panels of the present invention on the commercial market is highly unlikely. The invention in its many ramifications and great versatility is nevertheless to be understood to cover such a contingency.

TOP MOLD MODIFICATION

Although the top mold has been described above as having the bottom formed as an actual mold surface, the broad scope of invention is in this instance extensible. Thus, the bottom of the top mold tank can be formed as a flat sheet the same as the top of the bottom mold. To this there can be detachably connected a mold sheet or caul sheet in the manner in which this was done in FIG. 4 relative to bottom mold 126. Thus the broad scope of invention encompasses readily replaceable upper and lower molds for ease of shape change and of course minimum loss of product and materials because of short down time for change over.

Note that aluminum has been elected for the mold surfaces because of its high heat transfer. Within the broad scope of invention, however, this surface might be made of Teflon or other high temperature resistant resin. Also, within the broad scope of invention, a coating of Teflon or high melting wax or the like can be applied to the mold surfaces to provide greater lubricity for passage of the laminate. Actually, a Teflon coated, galvanized iron sheet might be used in some instances.

It is also within the extended scope of invention to make the lower mold surface flexible. In this sense, the lower mold surface might be part of a pressure tank and pressurized fluid used to press the bottom mold uniformly into contact with the laminate. Also, the top tank could be similarly pressurized for accurate control and exact conformity to or with the bottom mold.

EXTENSION OF NIP CONSTRUCTION

The nip disclosed in the foregoing specification has been described as being formed by two corotatable cylindrical rolls or equivalent structures. However it is believed that the invention can be logically extended to include two fixed cylindrical surfaces positioned similarly to the roll surfaces.

By so operating, such surfaces would be coated with a suitable lubricant to allow passage of the cover film by sliding movement. This would permit the cover film to carry the mats in unstressed condition in the manner described relative to the operation of FIGS. 1, 14 and others.

Mats made from continuous fibers have been discussed generally. However, the extended scope would include chopped strand mats. Also, the extended scope would include non-reinforcement type materials, including glass flakes, fillers, other fibrous materials, etc. Thus, the invention is not limited to structural-type panels requiring reinforcement; it is also applicable to decorative panels using color and filler only.

In broader aspect, therefore, the invention relates not only to panel formation but also to a novel apparatus and method of handling acrylic resin systems.

We claim:

1. In a method of forming a synthetic resin panel from a thermosetting resin and a fibrous reinforcement mat, the resin having a monomer component, and characterized by a polymerization exotherm sufficient to boil the monomer component, the steps of positioning the reinforcement material and liquid resin between pliable cover films to form a wet lay-up, radiating the lay-up to reduce the humidity content of the cover films to uniform level, then heating the lay-up to a temperature sufficient to initiate polymerization of the resin by intimately contacting the lay-up with a body of heated liquid, and then maintaining polymerization temperature for a sufficient period to set the resin by withdrawing excess exothermic heat of polymerization from the resin back into said liquid to control rate of polymerization to prevent monomer boil, simultaneously with said polymerization, molding the lay-up to a selected cross sectional configuration, and then following the molding, subjecting the panel to further heat treatment to post cure the resin.

2. In a method of forming a synthetic resin panel containing fibrous reinforcement, from a liquid resin having a monomer component, and characterized by a polymerization exotherm sufficient to boil the monomer component, the steps of forming a reinforcement mat from a strand made up of a plurality of continuous fibers, placing the mat and the liquid polymerizable thermosetting resin into a layer between pliable cover films to form a wet lay-up, heating the lay-up to a temperature sufficient to initiate polymerization of the resin by intimately contacting the lay-up with a layer of heated liquid, then maintaining polymerization temperature for a sufficient period to set the resin by withdrawing excess exothermic heat of polymerization from the resin back into said liquid to control the rate of polymerization to prevent monomer boil, simultaneously with said polymerization, molding the lay-up to a selected cross sectional configuration, and then subjecting the molded material to further heat for a sufficient time to substantially completely polymerize residual monomer.

3. In a method of forming a sheet-like panel from a polymerizable thermosetting liquid resin system having a polymerization exotherm sufficient to boil the monomer component:

|   | Parts by wt. |
|---|---|
| Solution of 23–27% methyl methacrylate polymer in methyl methacrylate monomer | 100 |
| Methyl methacrylate monomer | 10 |
| Lauroyl peroxide (percent) | 0.8 |
| Methyl ethyl ketone peroxide (percent) | 0.16 |
| Tert-butyl peroxypivalate (percent) | 0.72 | and a fibrous reinforcement mat,
the steps of
forming them at and liquid resin into a layer between pliable cover films to provide a wet lay-up,
gelling the resin by heating the lay-up to a temperature to initiate polymerization and develop the exotherm, by intimately contacting the lay-up with a body of heated liquid,
then maintaining polymerization temperatures for a sufficient period of time to set the resin while removing excess exothermic heat from the resin back into said liquid to prevent monomer boil,
then molding the gelled lay-up by
heating the gelled lay-up to develop further polymerization and provide exotherm by intimately contacting the lay-up with a body of heated liquid,
and then maintaining molding polymerization temperature for a sufficient period to set the resin while removing excess exothermic heat from the resin back into said liquid to prevent monomer boil,
and simultaneously with said polymerization, molding the lay-up to a selected cross-sectional configuration.

References Cited

UNITED STATES PATENTS

| 2,101,107 | 12/1937 | Strain | 161—ACRYLIC |
| 2,468,094 | 4/1949 | Marks | 260—885 |
| 2,784,763 | 3/1957 | Shorts | 156—324X |
| 3,022,208 | 2/1962 | Vanderbilt | 156—332 |
| 3,065,199 | 4/1960 | Collardeau et al. | 156—332 |
| 3,109,763 | 11/1963 | Finger | 161—G.F. |
| 3,131,115 | 4/1964 | Robitschek et al. | 156—332 |

REUBEN EPSTEIN, Primary Examiner

U.S. Cl. X.R.

156—289, 242; 260—885